July 10, 1956
M. J. McCONNELL
2,753,640
ILLUMINATED SIGN FOR VEHICLES
Filed Sept. 9, 1953
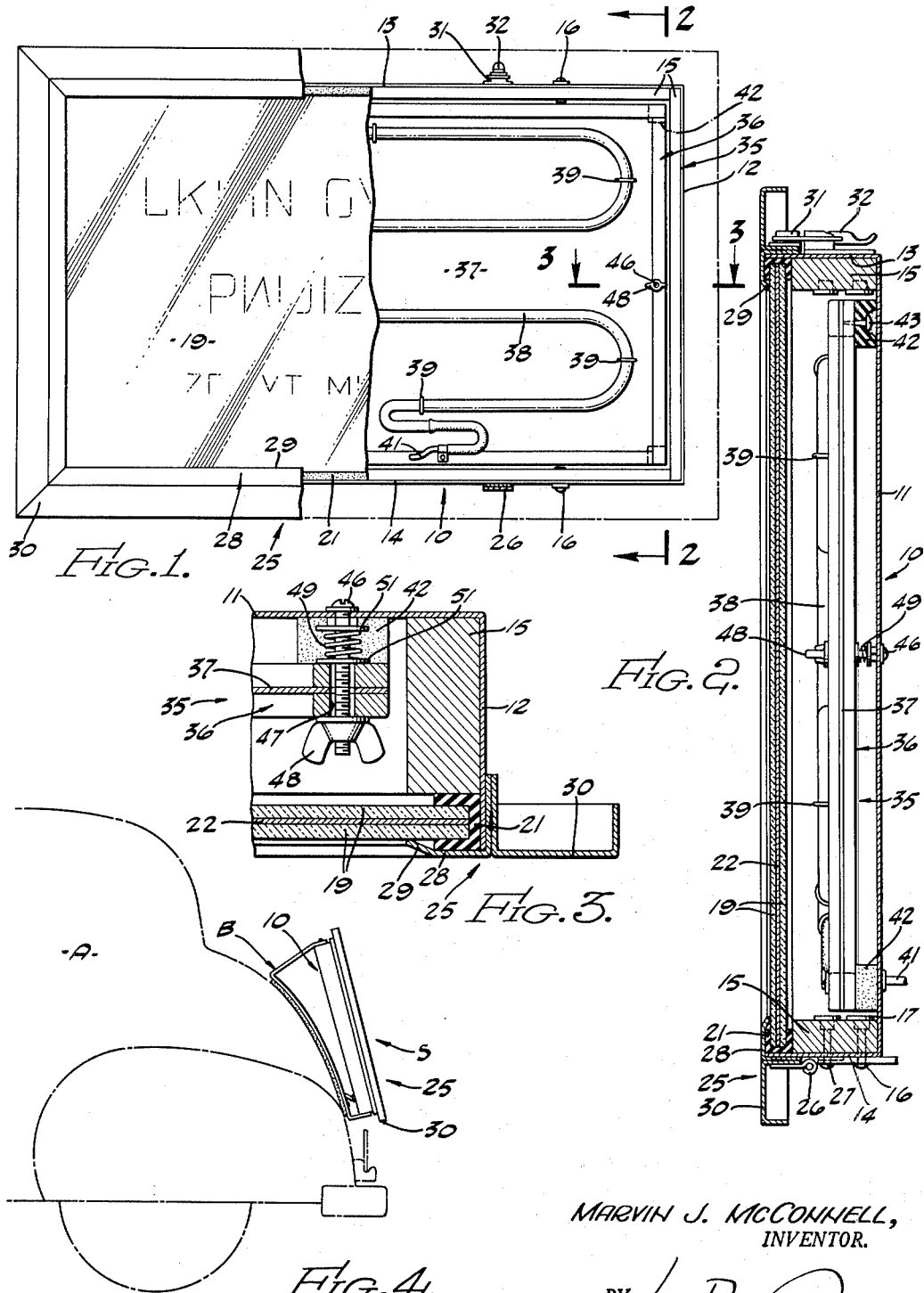
MARVIN J. McCONNELL,
INVENTOR.
BY
ATTORNEY

United States Patent Office 2,753,640
Patented July 10, 1956

2,753,640
ILLUMINATED SIGN FOR VEHICLES

Marvin J. McConnell, Whittier, Calif., assignor to Taxineon, Inc., Whittier, Calif., a corporation of California Application September 9, 1953, Serial No. 379,145

1 Claim. (Cl. 40—132)

The present invention relates to signs in general and particularly to an illuminated sign adapted to be mounted upon moving vehicles and there subjected to vibration and shock. More specifically the invention relates to an improved mounting for illuminating tubing embodied in an electrical sign for moving vehicles which is characterized in that the illuminated tubing, which is at times long and which is always frangible, will be protected against the vibrations and shocks incident to travel over the highways.

Advertising signs displayed interiorly and exteriorly upon commercial vehicles have become common in American cities. In certain preferred embodiments illuminating means are incorporated which direct light rays onto or through the material bearing the advertisement. The illuminating means may be illuminating tubing the length of which will vary with the design of the sign and its size. Such tubing, as is well known, is relatively rigid and may be broken upon impact, vibration or shock. Accordingly the mounting of such illuminating means in a manner which will preserve life through preventing destruction from vibration and shock, to which the vehicle body is inevitably subjected in its ambulatory movement, presents a real problem. The rigid mounting of such tubing upon the vehicle body is obviously to be avoided. Mounting the tubing at spaced points along its length upon resilient supports has been tried but is also subject to the objection that between the supported points the tube is unsupported and upon violent shock the mass and inertia of the tubing between supports may be sufficient forces to cause breakage. Superior to the previously mentioned mountings is the type incorporating a taut canvas sheet upon which the tubing is centrally mounted. The sheet, though stretched taut, is inherently flexible and is free across its length and breadth to vibrate with the supported tubing positioned centrally thereon. Satisfactory within limited ranges this support is unfortunately characterized in that the sheet itself is inherently flexible and its central areas are displaceable relative to its fixed marginal areas. If sufficiently loose as to provide appreciable flexibility required to achieve resilience and effective absorption of shock, then in the presence of severe shock the central portion of the tubing is permitted greater displacement than portions supported by the marginal portions of the sheet and breakage can result.

The present invention has the advantages of the last mentioned type of mounting without its disadvantages. In the place of a tautly drawn sheet of canvas there is substituted a sheet or plate of sheet metal mounted within a frame which is itself resiliently supported. In addition to having the advantage of greater life than the canvas the metal sheet type support is more importantly different in that with its frame it acts as a relatively rigid unit to support the connected tubing. The sheet metal is inherently less flexible than the canvas and the breakage possible because of that flexibility is avoided for the tubing is supported with substantially the same resilience at all points. As a result less breakage occurs.

Referring now to the drawing in which a preferred embodiment of the invention is illustrated, Figure 1 is a front view of a sign embodying mounting means constructed in accordance with the present invention, certain parts being broken away;

Figure 2 is a vertical section looking in the direction of the arrows above line 2—2 of Figure 1 and illustrates the resilient mounting of the tubing carrier, the seated relationship of the transparent window, and the cooperating retaining relationship of the pivoted rim with the window;

Figure 3 is a partial section upon line 3—3 of Figure 1 showing the manually releasable retaining means by which the tubing carrier or frame is held against the resilient supports; and Figure 4 illustrates the position of a sign constructed in accordance with the present invention upon the trunk of an automobile or taxicab.

Referring again to the drawing in which a preferred exemplary embodiment of the invention is illustrated, the sign body is seen to comprise a shallow box-like casing 10 formed of sheet metal, preferably stainless steel or aluminum, and having a back 11, side walls 12, and top and bottom walls 13 and 14. For purposes of providing greater strength and rigidity there is provided an open frame 15 which abuts the interior faces of the top, bottom and side walls and the adjacent marginal surface of the back 11. Strengthening frame 15 is secured in place by suitable securing bolts and nuts indicated at 16 and 17, respectively, suitably spaced along its length.

As clearly seen in Figures 2 and 3 frame 15 is not as wide as the side, top and bottom walls to provide a receiving seat within the confines of those walls for a closure as will be described.

The open front of the box-like housing or casing 10 is closed by a window comprising a pair of panes of glass 19 secured together by an enclosing peripheral U-sectioned rim 21 of rubber or other suitable resilient material. The rim is of a size and thickness as to fit snugly within the seat formed in housing 10 contacting the housing side, top and bottom walls and the outer face of frame 15. Rim 21 extends outwardly or forwardly substantially into the plane of the forward edges of the casing top, bottom and side walls as is most clearly shown in Figure 3. The sheet of advertising material, preferably comprising a transparent paper upon which advertising material is printed, is indicated at 22 and is positioned adjacent a pane 19, and in the form illustrated, between the panes 19, being held there in planar condition.

An open-front cover, indicated generally by the reference character 25, is pivotally connected to housing 10 by hinges 26 positioned on the underside of the housing bottom wall 14, each hinge being secured in place by one or more bolts 27. The cover comprises an L-sectioned encircling rim 28 dimensioned closely to encircle housing 10 and includes an inwardly sloping inner marginal portion 29 which contacts the outer pane 19 inside the rim 21 to function to force the window and particularly its rim 21 inwardly and into abutting contact with the forward face of the frame 15. The cover unit 25 is completed by an encircling U-sectioned outer rim 30 the forward face of which lies in the plane of the forward face of rim 18 and complements it in providing a cover of greater rigidity. At the top of casing 10, and opposite the hinges 26, cover 25 is provided with one or more pins 31 so positioned as to be engageable by an overcenter latch 32 carried by the top wall 13 of housing 10.

Within the housing 10 is positioned a resiliently mounted carrier or support unit 35 comprising an open frame 36 of the same general shape as the body 10 but of smaller size. Across the open face of frame 36 and reinforced around its marginal edges thereby extends a metal sheet 37 having strength and rigidity sufficient as to render it inflexible and stiff under all pressures and forces within the range to which it will be subjected in use. The carrier 35, comprising the frame 36 and plate 37 constitute a displaceable unit positioned in a floating relationship within the interior of the body 10 and supporting an elongated illuminating tubing element 38 suitably secured as by clips 39 spaced along its length. Tubing 38 is provided with an external source of electricity through a suitable lead 41 extended rearwardly through the frame 36 and rear wall 11 of housing 10 at the lower portion thereof.

Carrier 35 is spaced from the housing rear wall 11 by resilient pads 42 formed of suitable rubber or synthetic rubber. Pads 42 are affixed to frame 36 of carrier 35 as by means of suitable screws or nails 43 in each instance. They are spaced around the periphery of the frame 36 and preferably at the corners, as indicated in Figure 1. Frame 36 is held at each side, and forced against the supporting pads 42 at that side, by means of a bolt and nut unit comprising a bolt 46 which extends forwardly through the housing rear wall 11 with its head abutting the outer surface thereof, its threaded shank extended in spaced relationship through a suitable bore 47 in the frame 36 to seat a conventional wing nut 48. A coil spring 49 is positioned between the back of the carrier 36 and the back wall 11 to provide an additional resilient mounting, suitable washers 51 at the opposite end of the spring providing suitable abutting surfaces. By tightening the wing nut 48 the carrier 35 is forced toward the back wall 11 and the resilient pads 42 are slightly compressed.

In Figure 4 the advertising sign mounting means constructed in accordance with the present invention is indicated generally by the reference character S and is shown mounted by means of suitable bracket B upon the trunk of an automobile A indicated in phantom lines. When so positioned the transparent window faces rearwardly and the sign is visible to those looking toward the rear of the automobile.

To place the sign in use it is suitably mounted as illustrated in Figure 4 with the connector 41 connected to a source of electric current to energize the illuminating tubing. The retaining cover 25 is first pivoted outwardly by releasing the latch 32. This permits the window unit to be withdrawn and by displacing the encircling resilient rim 21 the two panes 19 can be separated and the transparent advertising sheet positioned therebetween. The rim is then replaced and the window unit relocated in the position illustrated in Figure 2. The retaining cover 25 is again latched in place and the window is retained in position. The lighting of the illuminating tubing behind the window causes the light rays therefrom to pass through the advertising which is clearly visible. The mounting of the carrier 35 by means of the resilient supports 42 and 49 cause shocks transmitted from the vehicle A through the frame and to the housing 10 to be absorbed and while some vibration will be transmitted to the carrier and the tubing supported thereon yet its intensity and force will be so materially reduced that no damage will be done to the tubing. Additionally, the inherent strength of the metallic plate 37 prevents bending within the length of the tubing and so breakage which has heretofore resulted.

While the particular apparatus herein shown and described in detail is fully capable of attaining the objects and providing the advantages hereinbefore stated, it is to be understood that it is merely illustrative of the presently preferred embodiments of the invention and that no limitations are intended to the details of construction or design herein shown other than as defined in the appended claim.

I claim:

An illuminated sign for vehicles, comprising a box-like casing having sides, ends and a back, a transparent window closing the front of said casing, a pivoted marginal framework encircling the transparent window to hold it in position against said casing, a readily removable illuminating tubing unit positioned within casing between said transparent window and said back, said unit comprising a flat metal sheet, a marginal frame encircling said sheet to provide support therefor and to prevent bending and flexure therein, resilient abutment pads fixed to one side of said frame in position to abut the back of said casing, said pads being relatively soft and resilient, frangible illuminating tubing secured directly to said sheet in a manner insuring conjoint movement only, bolts extended from said back forwardly through said frame, and manually adjustable wing nuts on said bolts abutting the side of said frame opposite said pads to force said frame toward said back to compress said pads to a selected degree to mount said tubing unit floatingly in said casing, said unit being removable as a unit from said casing upon pivoting said window to open position and upon displacing said wing nuts.

References Cited in the file of this patent
UNITED STATES PATENTS

| | | |
|---|---|---|
| 1,364,860 | Betts | Jan. 11, 1921 |
| 1,854,654 | Koch | Apr. 19, 1932 |
| 2,192,712 | Livingston | Mar. 5, 1940 |
| 2,465,034 | Peters | Mar. 22, 1949 |
| 2,678,797 | Roy | May 18, 1954 |